(12) United States Patent
Pfeiffer et al.

(10) Patent No.: US 12,143,555 B2
(45) Date of Patent: Nov. 12, 2024

(54) METHOD AND APPARATUS FOR PRINTING A PAPER WEB

(71) Applicant: SWISS KRONO Tec AG, Lucerne (CH)

(72) Inventors: Sabrina Pfeiffer, Kyritz (DE);
Sebastian Dicke, Bantikow (DE);
Falko Geitz, Zernitz-Lohm (DE);
Frank Oldorff, Schwerin (DE)

(73) Assignee: SWISS KRONO TEC AG, Lucerne (CH)

( * ) Notice: Subject to any disclaimer, the term of this patent is extended or adjusted under 35 U.S.C. 154(b) by 0 days.

(21) Appl. No.: 18/266,939

(22) PCT Filed: Nov. 25, 2021

(86) PCT No.: PCT/EP2021/082974
§ 371 (c)(1),
(2) Date: Jun. 13, 2023

(87) PCT Pub. No.: WO2022/135824
PCT Pub. Date: Jun. 30, 2022

(65) Prior Publication Data
US 2023/0396725 A1    Dec. 7, 2023

(30) Foreign Application Priority Data

Dec. 21, 2020 (EP) ..................................... 20216013

(51) Int. Cl.
*H04N 1/60* (2006.01)
*G06F 3/12* (2006.01)
*H04N 1/00* (2006.01)

(52) U.S. Cl.
CPC ......... *H04N 1/6013* (2013.01); *G06F 3/1208* (2013.01); *H04N 1/00665* (2013.01); *H04N 1/6044* (2013.01)

(58) Field of Classification Search
CPC .............. G06F 3/1208; H04N 1/00665; H04N 1/6044; H04N 1/6047; H04N 1/6013;
(Continued)

(56) References Cited

U.S. PATENT DOCUMENTS

| 5,182,638 A | 1/1993 | Toshio et al. |
| 7,903,270 B2 * | 3/2011 | Kamasuka ........... G06V 10/751 |
| | | 358/1.14 |

(Continued)

FOREIGN PATENT DOCUMENTS

EP    3578939    12/2019

OTHER PUBLICATIONS

International Search Report issued on Jan. 17, 2022 in corresponding Application No. PCT/EP2021/082974, 13 pages.

*Primary Examiner* — Negussie Worku
(74) *Attorney, Agent, or Firm* — Andrew M. Calderon; Calderon Safran & Wright, PC

(57) ABSTRACT

The disclosure relates to a method for printing a paper web with at least one print motif by means of a digital printing facility. The method includes: providing a digital image of a master sample of the print motif, printing a plurality of copies of a section of the at least one print motif with (Continued)

different color settings, creating digital images of the printed copies, comparing the digital images of the printed copies with the digital image of the master sample, where a degree of similarity is determined in each case, selecting color settings using the determined degrees of similarity and printing the print motif onto the paper web with the selected color settings.

14 Claims, 2 Drawing Sheets

(58) Field of Classification Search
CPC .......... H04N 1/00013; H04N 1/00023; H04N 1/00039; H04N 1/00076; H04N 1/00082; H04N 1/0044; H04N 1/00801; H04N 1/00809; H04N 1/00811; H04N 1/00816; H04N 1/00824; H04N 1/387; H04N 1/3873; H04N 1/393; H04N 1/46; H04N 1/60; H04N 1/6005; H04N 1/6008; H04N 1/6011; H04N 1/6033; H04N 1/6036; H04N 1/6075; H04N 1/6077; H04N 2201/0081; H04N 25/44; B41F 33/0036; G01J 2003/2826; G01J 3/463; G06T 2207/10036; G06T 2207/20216; G06T 3/4023
USPC ........................................................ 358/1.15
See application file for complete search history.

(56) References Cited

U.S. PATENT DOCUMENTS

| | | | |
|---|---|---|---|
| 10,986,251 B2 * | 4/2021 | Liefferink | H04N 1/6075 |
| 2004/0220962 A1 * | 11/2004 | Kaneda | G06F 16/5846 |
| | | | 707/E17.022 |
| 2006/0279814 A1 * | 12/2006 | Fukada | H04N 1/46 |
| | | | 358/540 |
| 2008/0056545 A1 * | 3/2008 | Kamasuka | G06V 10/751 |
| | | | 382/124 |
| 2011/0262628 A1 * | 10/2011 | Sferlazzo | H01L 31/0322 |
| | | | 427/124 |
| 2017/0195519 A1 | 7/2017 | Takahiro | |
| 2020/0374419 A1 * | 11/2020 | Liefferink | H04N 1/6005 |
| 2021/0144276 A1 * | 5/2021 | Maheshwari | H04N 1/6033 |
| 2021/0245493 A1 | 8/2021 | Lehnhoff | |
| 2023/0322008 A1 * | 10/2023 | Dicke | B41M 5/0047 |
| | | | 347/14 |
| 2023/0396725 A1 * | 12/2023 | Pfeiffer | H04N 1/6036 |

* cited by examiner

METHOD AND APPARATUS FOR PRINTING A PAPER WEB

FIELD OF INVENTION

The invention relates to a method for printing at least one print motif onto a paper web by means of a digital printing facility as well as a digital printing facility that is configured to carry out such a method.

BACKGROUND OF INVENTION

Paper products that feature a decorative pattern or motif are now used in a wide range of products, for example to influence the appearance of the products. For example, this relates to floor, wall or ceiling panels where a printed decorative paper is applied to, especially glued or laminated onto, a solid core, for example made of a wood-based material. Here, the individual decorative papers are printed in the form of a paper web, which is preferably rolled up on a paper roll, and not cut to the desired size until after printing. Paper rolls that are used in these methods can feature paper webs that are several kilometers long and weigh several tons. Paper webs onto which a print motif has been printed are also used, however, in many other products, such as wallpaper or art prints.

In this case, it is important to be able to ensure consistent printing quality. It is particularly important that as uniform an optical impression as possible is generated on the printed paper in, as far as possible, every printing cycle. This ensures that the product always looks the same for the customer and that different products which, for example, feature a part of the printed paper web, can be combined. Taking the example of floor panels, this is immediately apparent. To increase acceptance on the part of the customer, it must be possible to combine floor panels of different production batches, without being able to later identify and determine which panels were printed in which print cycle.

It is therefore common to produce a master sample that creates the desired visual impression and to compare all further productions and printed paper webs with the master sample. A wide range of factors can have an influence on the visual appearance of a printed paper web. On the one hand, this relates to environmental factors at the production location, such as temperature and/or humidity in the digital printing facility. On the other hand, production parameters, such as the quantity and/or composition of the primer coating, also known as primer, and/or the printing ink used, will also have an impact on the overall visual result of the print cycle. Properties of the printed paper web, such as paper moisture and temperature of the paper, can also alter the overall visual impression of the printed paper. It is therefore known to be insufficient to save production parameters that were used during production of the master sample and to base all subsequent printing of the same print motif on these production parameters.

Therefore, it is common to first create a test print of the print motif to be printed on a paper web. This test print is then compared with the master sample, wherein it is determined whether the test print is sufficiently similar to the master sample. The prior art encompasses various methods to achieve this, by way of which a degree of similarity can be determined. If the result of such a comparison is negative, i.e., the deviation between the test print and the master sample is too great, the production parameters, in particular the color settings used when printing the test print, are altered. A second test print is created with the altered color settings, the test print being compared once again with the master sample. The aim of amending the color settings is to render the test print more similar to the master sample. This iterative method is carried out until the similarity between the most recent test print and the master sample is sufficiently great. Production, i.e., the actual printing of the print motif onto the paper web, can then commence.

The disadvantage is that this method is extremely time-consuming. The digital printing facility is used to generate the test print. However, the digital printing facility cannot produce and print while the similarity between the test print and the master sample is being checked; rather, it must be shut down until the result of the comparison is available. In particular, if a large number of test prints have to be generated one after the other, it means long downtimes and therefore high costs. Small print orders in particular are therefore not cost-effective, as the ratio of downtime to production time is especially unfavorable.

SUMMARY

The invention aims to accelerate the method and particularly to reduce the proportion of downtime.

The invention solves the addressed task by way of a method according to the preamble, which comprises the following steps:

providing a digital image of a master sample of the print motif, printing a plurality of copies of a section of the at least one print motif with different color settings, creating digital images of the printed copies, comparing the digital images of the printed copies with the digital image of the master sample, wherein a degree of similarity is determined in each case, selecting color settings using the determined degrees of similarity and printing the print motif onto the paper web with the selected color settings.

The method according to the invention allows downtimes to be significantly reduced. It is no longer necessary to create a test print of the entire print motif. Rather, it is sufficient to use a section of the at least one print motif in order to determine the color settings to be used. According to the invention, this section is printed in multiple copies, wherein different color settings are used in each case. Preferably, no two copies are printed with the same color settings; rather, the color settings used differ for each of the copies printed. It is therefore no longer necessary to conduct the individual test prints iteratively one after the other. Digital images of the printed copies are then generated, which are compared with a digital image of the master sample. This preferably occurs in an electric control unit, especially an electronic data processing device which, particularly preferably, forms part of the digital printing facility.

The digital images of the copies are preferably captured with an optical sensor, such as a digital camera, and made available as electronic data of the electric control unit. The optical sensor preferably includes an optical and/or spectral color measuring device which, particularly preferably, is configured for a hyperspectral surface measurement. The electric control unit compares the digital images created of the copies with the digital image provided of the master sample and generates a value that is a measure of similarity. Using these values created for each copy, a color setting can be selected by means of an algorithm, which runs in the electric control unit, wherein the subsequent printing of the print motif onto the paper web is based on said color setting.

Preferably, the digital image of the master sample is not a digital image of the entire master sample of the print motif, but simply a digital image of the section of the master sample of the print motif that corresponds to the section of the print motif that is printed in a plurality of copies. This reduces the data volume of the image of the master sample and accelerates the method.

The print motif is subsequently applied to the paper web with the selected color settings and in the desired quantity. It is thus possible to select a color setting that ensures a sufficient similarity between the subsequently printed print motif and the master sample by way of a single test print, which contains the plurality of the copies of the section with different color settings. The repeated printing of a test print can be omitted in each case, thus allowing the downtimes of the digital printing facility to be significantly reduced.

For example, the printed motif is 205×140 cm large and preferably contains the motif of a number of different elements, such as panels. The size of the section that is printed in multiple copies is preferably 45×33 cm, 42×30 cm or 40×30 cm; considerably smaller sections, for example 10×15 cm, 11×15 cm or 10×30 cm in size, can also be used. The smaller the section selected, the more copies of the section can be printed onto the same surface of the paper web and the more color settings can be provided for the selection.

In a preferred embodiment, the color settings of the copy are selected whose digital image exhibits the highest degree of similarity with the digital image of the master sample. As a result, the optimal color setting with the color settings used to print the plurality of copies is selected and the best possible match of the printed motif to the master sample with these color settings is ensured.

Preferably, the digital image of the master sample and/or the digital images of the copies are hyperspectral images. A hyperspectral image not only contains information on the visible range of the color spectrum, but also beyond it. The wider the color spectrum used for the digital image, the more precise and high-quality the comparison of the various digital images. It is therefore advantageous if both the digital image of the master sample and the digital image of the respective copies of the section are hyperspectral images. In a particularly preferred embodiment, the digital image is created under a standard illuminant, such as D65 and/or D50. The use of multiple images, captured and recorded under different illuminants, is also possible, wherein they then collectively form the digital image.

Advantageously, at least 5, preferably at least 10, especially preferably at least 25 copies of the section are printed. As explained above, these all preferably differ in at least one setting, preferably in at least one color setting. The more copies of the section printed with different color settings, the more digital images of the copies can be compared with the digital image of the master sample and therefore the better the degree of similarity and therefore the print quality of the printed motif subsequently printed on the paper web is likely to be.

The color settings are preferably given in the so-called "Lab" color space. Here, colors are defined by the three parameters "L", the so-called L value, "a", the so-called a value, and "b", the so-called b value. The L value describes the lightness of the color used. The a value describes a position of the color on a green-red axis, which may also be referred to as a green-magenta axis. The b value describes a position of the color used on the yellow-blue axis. The three parameters L, a and b can be used to unambiguously describe the colors used. In a preferred embodiment, the different color settings at which the plurality of copies of the section of the printed motif are printed differ from each other in at least one of these parameters. Particularly preferably, several of the copies differ from each other in precisely one parameter. For example, with a selected combination of parameters a and b, it is practical to take different color settings in terms of the L parameter and to use corresponding color settings when printing the copies. Additionally or alternatively, it is practical, with a selected combination of parameters L and a, to vary parameter b and/or, with a selected combination of parameters L and b, to vary parameter a. The more copies of the section printed with different color settings, the finer the variation in the various parameters can be selected.

Particularly preferably, the method comprises multiple printed motifs being printed onto the paper web. This is especially advantageous when the individual printing orders, i.e., specifically the number of reproductions of the printed motif, are relatively small. In particular, individual printing orders, for example floor panels that feature a company logo, often constitute relatively small orders, of which several can be processed and completed on a single paper web. In this case, the advantages of this method are especially noticeable. For such a method, digital images of all master samples are first provided. A plurality of copies of at least one section from several, preferably from all, of these print motifs are printed with different color settings. The digital image of the respective master sample preferably corresponds only to the section that is printed with different color settings.

It is advantageous, but not necessary, to print the various copies of the sections of the printed motif of different printed motifs separately from each other. It is only important to know which of the sections belongs to which print motif.

The digital images of the printed copies are then created and compared with the respective digital image of the corresponding master sample. As explained above, this comprises the creation of degrees of similarity between the digital image of a copy and the digital image of the corresponding master sample. With these, the color setting that is to form the basis of the print is selected for at least the first print motif to be printed. Preferably, the color settings of all print motifs to be printed are determined and selected before the first print motif is printed onto the paper web. However, it is in principle also possible to determine the color settings in the electric control unit for all further print motifs that are printed after the first print motif while the first print motif is being applied to the paper web in the desired reproduction.

Advantageously, multiple, preferably two, three or four, sections of the at least one print motif, preferably of several of the print motifs, especially preferably of all print motifs, are used. These are preferably selected in such a way that they deviate strongly from each other in terms of color. It is therefore possible to determine the similarity between the print motif to be printed and the master sample across a wide color spectrum.

The plurality of the copies is preferably printed onto an end section of a first paper web, preferably a paper roll. The print motif itself is preferably printed onto a second paper web, preferably a further paper roll. In this case, it has been proven beneficial if the first paper web is removed from the digital printing facility after the copies have been printed and the second paper web clamped into the digital printing facility. In this way, the downtime, which occurs anyway when a paper web has to be replaced, can be utilized in a practical manner, for example to carry out the method and determine the color settings for printing the print motif. This applies in particular for semiautomatic or manual roller bearers. In the case of a fully automatic roller bearer, two axles and therefore two rolls are clamped at the same time. When the roll is changed, the new roll is then glued on at full production speed and the printed roll is cut off to form another continuous paper web. The samples can then be taken out before the printed/cut-off roll is removed from the axle. In addition, the printed copies of the section do not have to be cut out of a running paper web when the printed paper web is fed for further processing. The end section of a paper web is preferably at most 15 m long, preferably at most 10 m, especially preferably at most 5 m. Particularly preferably, the digital images of the printed copies of the section are created before the first paper web is removed.

The invention also solves the addressed problem by way of a digital printing facility that is configured to carry out a method of the type described here. The working width of such a digital printing facility, which may also be referred to as a digital printing system, is preferably at least 1300 mm, preferably at least 1600 mm, especially preferably at least 2000 mm and at most 2800 mm, preferably at most 2300 mm, preferably at most 2200 mm and especially preferably at most 2100 mm. The speed of the system at which the surface to be printed is moved through the system is preferably at least 80 m/min, preferably at least 100 m/min and particularly preferably at least 130 m/min and at most 270 m/min, preferably at most 200 m/min and particularly preferably at most 140 m/min when printing on paper. When printing onto heavier objects, for example wood-based material panels, the speed is preferably at least 20 m/min, preferably at least 60 m/min, preferably at least 70 m/min and particularly preferably at least 80 m/min and at most 110 m/min, preferably at most 100 m/min and particularly preferably at most 90 m/min.

If a primer is applied to the surface to be printed on, the applied quantity is preferably at least 1 $g/m^2$, preferably at least 2 $g/m^2$ and especially preferably at least 3 $g/m^2$ and at most 10 $g/m^2$, preferably at most 6 $g/m^2$, especially preferably at most 4 $g/m^2$.

The method can also be referred to as "patterning". In an embodiment example, wood decorative is produced on a paper digital printing facility with a working width of 2070 mm at a speed of 135 m/min. For example, CRYK water-based ink and a primer of approximately 3 $g/m^2$ are applied to a 65 g white decor paper. The wood decorative has repeat pattern dimensions of 1400 mm in length and 2070 mm in width. To check the color of the decorative pattern on the specific paper digital printing facility and to determine a color master sample, a fixed section is defined at the right-hand edge of the pattern with the dimensions 30×42 cm. It is saved in a new print file. The section is processed with six different color settings, which are in turn individually saved as print files. All six print files are combined side by side in one print file with an overall width of 6×30 cm=180 cm.

This makes optimum use of the print width with sections. After the collective print file has been sent to the printing facility and output with a color profile using software, the samples are visually assessed in a light booth under standard D65 light. It is decided that the color setting in the third print file is preferred and it serves as a future master sample for production. The first step, namely providing the digital image of the master sample, is thus complete. Of course, this does not have to be done in this way every time the method is carried out. The master sample, which is determined once for a given print motif, is re-used for future printing orders that relate to the same print motif.

Embodiment Example: Production Start 1

Before the start of production, only several copies of at least one section of the print motif are printed. Preferably, various sections of different decorative patterns are placed on a joint sheet in advance and printed. In the present embodiment example, multiple print motifs are to be printed onto the paper web in different quantities or the same quantity. A plurality of copies of at least one section of each of the print motifs is placed on the joint sheet and printed. The number of copies can differ from print motif to print motif.

The copies of the sections are compared with the provided digital image of the master sample using a hyperspectral measuring device and a corresponding software (such as ACMS: Advanced Colour Measurement System). The tolerance/similarity index is set at 92%. The degree of similarity must consequently be at least 92% so the color settings that form the basis of the respective section can also form the basis for printing the print motif. In the given embodiment example, the tolerance lies above the target in four print motifs. That is to say that, for each of these print motifs, a copy was found that exhibits a higher degree of similarity. In the case of one print motif, on the other hand, the print filed has to be corrected before the start of production. A plurality of copies of a section of this print motif is re-printed, now with different color settings. The method is carried out again. The correction can either be performed manually or in a semi-automated manner using a suitable software. (e.g., ColorGate and ACMS with the ColorCorrection Loop)

Embodiment Example: Production Start 2

In the second embodiment example, six identical sections from a single print motif with different color settings are placed on a joint sheet and printed in order to check them prior to the start of production. The color settings differ in the b color axis (yellow-blue). After the proof, the digital images of the sections are created with a hyperspectral measuring device and compared with a digital image of the master sample using a suitable software (such as ACMS). The similarity index is set at 92%. In the embodiment example, it is determined that copies 1 and 2 of the section are too blue and copies 4, 5 and 6 are too yellow. In these copies, the degree of similarity is less than 92%. At 94%, the degree of similarity of section number 3 is within the tolerance range. The production file stored for this section, with the color settings contained therein, is used for production, i.e., printing the print motif onto the paper web. The copies of the section were printed the day before at an end of a paper roll of the same batch to ensure an immediate start of production with the correct print file.

Embodiment example: Master sample production Wood decorative patterns are produced on a paper digital printing facility with a working width of 2070 mm at a speed of 135 m/min. For example, CRYK water-based ink and a primer of approximately 3 $g/m^2$ are applied to a 65 g white decor paper. The wood decorative patterns have repeat pattern dimensions of 1400 mm in length and 2070 mm in width. The conventional sampling of master samples is known in digital decorative pattern printing of rolls/sheets. For example, in decorative pattern printing, master sample sec tions for quality control are always taken at the same point and only at one part of the decorative pattern/repeat pattern. These can usually be checked for color fidelity/similarity index and evaluated with ACMS. Master samples can be taken more effectively if software (e.g. Photoshop/Color-Gate) is used to arrange the same digital master sample section of the decorative pattern as often as possible on the format to be printed. In digital printing, it is possible to create a new print file from this that is composed only of master sample sections and that makes optimum use of the print width. These "master sample print files" can also be produced outside of actual productions of the actual decorative pattern production in pure master sample productions. The color fidelity/similarity index to other master samples or productions can be checked with ACMS.

Furthermore, different decorative pattern master samples can be produced in one print file or in multiple print files in sequence. This facilitates the making-up of the sections as many master samples can be taken in few steps. Since not only a small part is taken from a repeat pattern, but rather the master sample sections are arranged across the entire print width, very little waste is produced. The master sample productions can be set in time slots, such as production gaps, so as to increase utilization of the production facility. At the same time, separate master sample production saves time for sample-taking during actual decorative pattern production and minimizes downtime.

BRIEF DESCRIPTION OF DRAWINGS

In the following, an embodiment example of the invention will be explained in more detail with the aid of the accompanying figures. The figures show.

DETAILED DESCRIPTION

Figure 1:
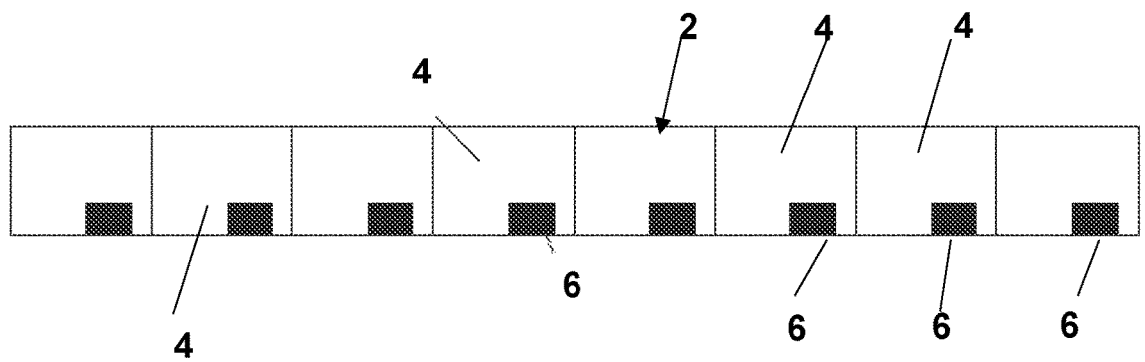
FIG. 1 is a schematic representation of a method according to the prior art.

FIG. 1 schematically depicts a paper web 2 on which a plurality of repeat patterns 4 are printed. Originally, a repeat pattern 4 refers to a full cylinder print of a printing cylinder. However, this term is still common for a digital printing facility and refers to the full print of a print motif. In FIG. 1, the repeat pattern 4 has been applied to the paper web 2 multiple times in a row. A section 6 is schematically depicted as a black box which, as can be seen in FIG. 1, is located at the same point in every repeat pattern 4.

Figure 2:
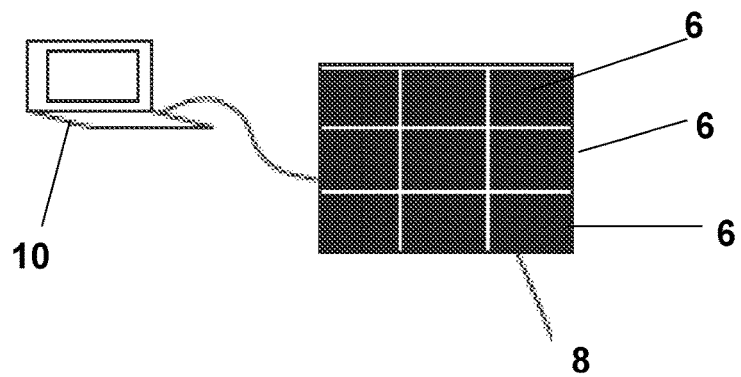
FIGS. 2 and 3 are different stages in a method according to a first embodiment example of the present invention.

FIG. 2 shows a plurality of copies of the section 6, which have been combined to form a print image 8. The individual sections 6, which are identical in terms of motif, are printed with different color settings. This is controlled via an electric control unit 10, which is preferably designed as an electronic data processing device.

Figure 3:
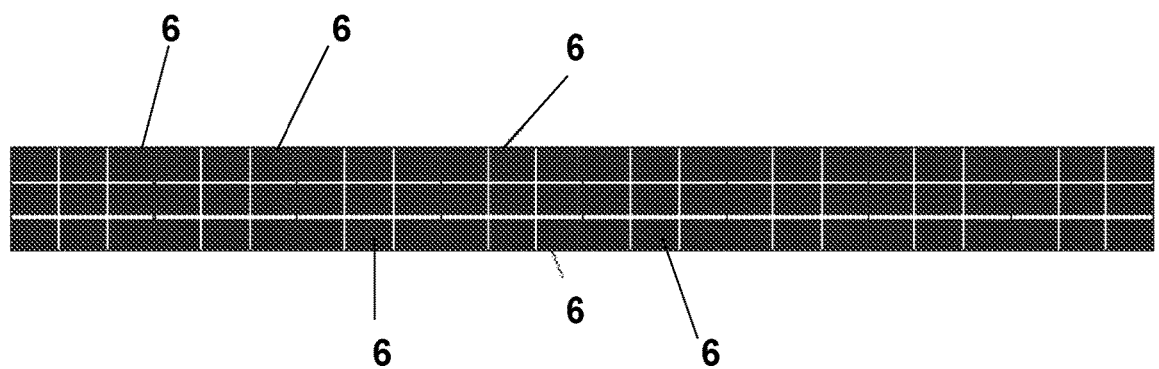

FIG. 3 shows the actual printed plurality of copies of the sections 6, each of which differs in its color settings.

The invention claimed is:

1. A method for printing a paper web with at least one print motif by a digital printing facility, comprising:
   providing a digital image of a master sample of the print motif,
   printing a plurality of copies of a section of the at least one print motif with different color settings,
   creating digital images of the printed copies, the digital images and the master sample of the print motif comprising a same motif,
   comparing the digital images of the printed copies with the digital image of the master sample, wherein a degree of similarity is determined in each case,
   selecting color settings using a highest similarity of the digital images of the printed copies with the digital image of the master sample based on the determined degrees of similarity, and
   printing the print motif onto the paper web with the selected color settings.

2. The method according to claim 1, wherein the color settings of the copy are selected whose digital image exhibits a highest degree of similarity with the digital image of the master sample.

3. The method according to claim 1, wherein the digital image of the master sample and/or the digital images of the copies are hyperspectral images.

4. The method according to claim 1, wherein at least copies of the section are printed.

5. The method according to claim 4, wherein at least 10 copies are printed.

6. The method according to claim 4, wherein at least 25 copies are printed.

7. The method according to claim 1, wherein the color settings are given in a "Lab" color space and differ in L value (lightness) and/or in a "a" value (green-red axis) and/or in a "b" value (yellow-blue axis).

8. The method according to claim 1, wherein the paper web is printed with more than one print motif, wherein
   digital images of all master motifs are provided,
   a plurality of copies of one section from several printed motifs is printed with different color settings,
   digital images of the printed copies are created and compared with the digital image of a corresponding master sample before the first print motif is printed onto the paper web.

9. The method according to claim 1, wherein multiple sections of at least one print motif are used.

10. The method according to claim 9, wherein two, three or four sections of at least one print motif are used.

11. The method according to claim 9, wherein all print motifs are used.

12. The method according to claim 1, wherein the plurality of copies is printed onto an end section of a first paper web and the print motif is printed onto a second paper web.

13. The method according to claim 12, wherein the first paper web is removed from the digital printing facility after the copies have been printed and the second paper web is clamped into the digital printing facility.

14. A digital printing facility configured to carry out a method according to claim 1.

* * * * *